US010391924B2

(12) United States Patent
Mizuno et al.

(10) Patent No.: US 10,391,924 B2
(45) Date of Patent: Aug. 27, 2019

(54) LIGHTING DEVICE CONTROL SYSTEM

(71) Applicant: DENSO CORPORATION, Kariya, Aichi-pref. (JP)

(72) Inventors: Ryu Mizuno, Kariya (JP); Hajime Kasai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 82 days.

(21) Appl. No.: 15/539,087

(22) PCT Filed: Nov. 18, 2015

(86) PCT No.: PCT/JP2015/082401
§ 371 (c)(1),
(2) Date: Jun. 22, 2017

(87) PCT Pub. No.: WO2016/103995
PCT Pub. Date: Jun. 30, 2016

(65) Prior Publication Data

US 2018/0111544 A1 Apr. 26, 2018

(30) Foreign Application Priority Data

Dec. 24, 2014 (JP) ................................ 2014-260585

(51) Int. Cl.
*B60Q 1/00* (2006.01)
*B60Q 1/14* (2006.01)

(52) U.S. Cl.
CPC ......... *B60Q 1/0094* (2013.01); *B60Q 1/0076* (2013.01); *B60Q 1/143* (2013.01); *B60Q 2300/112* (2013.01); *B60Q 2300/146* (2013.01)

(58) Field of Classification Search
None
See application file for complete search history.

(56) References Cited

U.S. PATENT DOCUMENTS

| | | | | |
|---|---|---|---|---|
| 7,985,010 | B2 * | 7/2011 | Kamioka | B60Q 1/085 362/465 |
| 8,754,764 | B2 * | 6/2014 | Bechtler | B60T 8/885 303/122.03 |
| 8,838,343 | B2 * | 9/2014 | Kasaba | B60Q 1/10 701/49 |
| 9,086,201 | B2 * | 7/2015 | Zhuang | B60Q 1/12 |
| 9,404,630 | B2 * | 8/2016 | Foltin | F21S 41/00 |
| 9,415,719 | B2 * | 8/2016 | Hayakawa | B60Q 1/143 |
| 9,956,902 | B2 * | 5/2018 | Fukayama | F21S 41/143 |
| 10,059,252 | B2 * | 8/2018 | Mizuno | B60Q 1/14 |

(Continued)

FOREIGN PATENT DOCUMENTS

| | | |
|---|---|---|
| JP | 2013-048014 A | 3/2013 |
| JP | 2013-173534 A | 9/2013 |

*Primary Examiner* — Truc M Do
(74) *Attorney, Agent, or Firm* — Knobbe, Martens, Olson & Bear, LLP

(57) ABSTRACT

A lighting device control system (1, 101, 201) includes an instruction signal generation unit (3) that generates an instruction signal for the control of the states of a lighting device (13, 15) mounted to a vehicle, and a control unit (5, 7) that controls the state of the lighting device according to the instruction signal. The instruction signal generation unit generates a plurality of instruction signals. The control unit controls the state of the lighting device according to the states of the plurality instruction signals.

5 Claims, 4 Drawing Sheets

(56) References Cited

U.S. PATENT DOCUMENTS

| | | | | |
|---|---|---|---|---|
| 2005/0218723 | A1* | 10/2005 | Yamazaki | B60Q 1/143 307/10.1 |
| 2006/0285342 | A1* | 12/2006 | Mizuno | B60Q 1/12 362/466 |
| 2007/0253597 | A1* | 11/2007 | Utida | B60Q 1/085 382/104 |
| 2010/0014302 | A1* | 1/2010 | Okumura | B60Q 1/10 362/466 |
| 2010/0213846 | A1* | 8/2010 | Thomas | G01S 13/88 315/82 |
| 2012/0306368 | A1* | 12/2012 | Tatara | B60Q 1/18 315/81 |
| 2013/0218413 | A1* | 8/2013 | Tanaka | B60Q 1/143 701/36 |
| 2015/0003087 | A1* | 1/2015 | Futamura | B60Q 1/143 362/466 |
| 2015/0149045 | A1* | 5/2015 | Mizuno | B60Q 1/1423 701/49 |
| 2015/0251586 | A1* | 9/2015 | Imaeda | B60Q 1/12 362/466 |
| 2016/0096466 | A1* | 4/2016 | Okumura | B60Q 1/24 315/82 |

* cited by examiner

LIGHTING DEVICE CONTROL SYSTEM

CROSS-REFERENCE TO RELATED APPLICATION

This application is based on and claims the benefit of priority from earlier Japanese Patent Application No. 2014-260585 filed on Dec. 24, 2014 the descriptions of which is incorporated herein by reference.

TECHNICAL FIELD

The present disclosure relates to a lighting device control system.

BACKGROUND ART

The turn-on/off of lighting devices of a vehicle are controlled as follows: Upon user's operating a switch in a compartment of the vehicle, an input signal corresponding to the operation is inputted to an engine control unit (ECU); and the ECU controls the turn-on and turn-off of the lighting devices by turning on/off a relay according to the input signal. Patent Literature 1 describes a main ECU and an auxiliary ECU used for lighting devices, with these ECUs used to control the turn-on and turn-off of the lighting devices.

CITATION LIST

Patent Literature

[PTL 1] JP 2013-173534 A

SUMMARY OF THE INVENTION

Technical Problem

According to the technique described in PTL 1, the main ECU outputs an instruction signal, and then the auxiliary ECU used for lighting devices controls the states of the lighting devices according to the instruction signal. If an erroneous signal is outputted for any reason, the lighting devices are brought into states different from those requested through the user's manipulation.

It is an object of the present disclosure to provide a lighting device control system that appropriately controls the state of a lighting device.

Solution to Problem

The lighting device control system of the present disclosure includes an instruction signal generation unit that generates an instruction signal used for controlling the states of lighting devices mounted to a vehicle, and a control unit that controls the states of the lighting devices according to the instruction signal. The instruction signal generation unit generates a plurality of instruction signals, and the control unit controls the lighting devices according to the states of the instruction signals.

Therefore, the lighting device control system of the present disclosure controls the states of the lighting devices more appropriately than does a control system configured to use only a single instruction signal.

DESCRIPTION OF EMBODIMENTS

Embodiments of the present disclosure will now be described with reference to the accompanying drawings.

First Embodiment

1. Configuration of Lighting Device Control System 1

Figure 1:
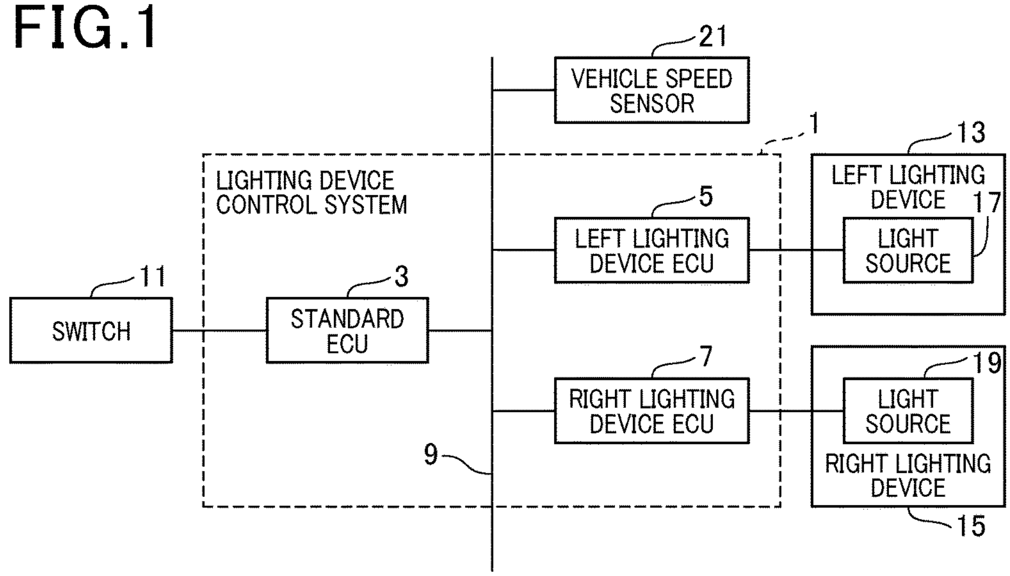
FIG. 1 is a block diagram illustrating a configuration of a lighting device control system according to a first embodiment.

With reference to FIG. 1, the configuration of a lighting device control system 1 according to the present embodiment will now be described. The lighting device control system 1 is used in a vehicle. A vehicle provided with the lighting device control system 1 will be hereinafter referred to as "the own vehicle". The lighting device control system 1 includes a standard ECU 3, a left lighting device ECU 5, a right lighting device ECU 7, and a communication line 9.

The standard ECU 3, which is a main ECU, controls functions of the own vehicle. The standard ECU 3 acquires an input signal from a switch 11, which is mounted inside a compartment of the own vehicle. The switch 11 is turned on or off by a user, and is used to turn on/off a left lighting device 13 and a right lighting device 15, which are mounted to the own vehicle. When the switch 11 is on as a result of the user's manipulation, the ECU 3 acquires an input signal indicating on from the switch 11. When the switch 11 is off as a result of the user's manipulation, the ECU 3 acquires an input signal indicating off from the switch 11.

In response to the input signal from the switch 11, the standard ECU 3 generates instruction signals A and B (the plurality of instruction signals) used for the control of the states (turn-on state or turn-off state) of the left lighting device 13 and the right lighting device 15 of the own vehicle, and outputs the instruction signals A and B. The instruction signals A and B are outputted with a predetermined time difference. Specifically, for example, the instruction signal A is outputted first, and then the instruction signal B is outputted. When the standard ECU 3 operates normally, the instruction signals A and B indicate an identical value. For example, when the input signal from the switch 11 indicates on, the instruction signals A and B outputted from the standard ECU 3 both indicate on, and when the input signal from the switch 11 indicates off, the instruction signals A and B outputted from the standard ECU 3 both indicate off.

The left lighting device ECU 5, which is an auxiliary ECU and is used for the left lighting device 13, acquires the instruction signals A and B from the standard ECU 3 via the communication line 9. According to the instruction signals A and B (the plurality of instruction signals), the left lighting device ECU 5 controls the state of the left lighting device 13. In other words, according to the instruction signals A and B, the left lighting device ECU 5 turns on or off a light source 17 of the left lighting device 13. The process performed by the left lighting device ECU 5 will be described in detail later. The left lighting device ECU 5 acquires, from a vehicle speed sensor 21, information on the speed of the own vehicle via the communication line 9.

The right lighting device ECU 7, which is an auxiliary ECU and is used for the right lighting device 15, acquires the instruction signals A and B from the standard ECU 3 via the communication line 9. According to the instruction signals A and B (the plurality of instruction signals), the right lighting device 7 controls the state of the right lighting device 15. In other words, according to the instruction signals A and B, the right lighting device ECU 7 turns on or off a light source 19 of the right lighting device 15. The process performed by the right lighting device ECU 7 will be described in detail later. The right lighting device ECU 7 acquires, from the vehicle speed sensor 21, information on the speed of the own vehicle via the communication line 9.

The communication line 9 connects the standard ECU 3 to the left lighting device ECU 5 and the right lighting device ECU 7. The communication line 9 transmits the instruction signals A and B outputted from the standard ECU 3 to the left lighting device ECU 5 and the right lighting device ECU 7. The standard ECU 3 is an example of the instruction signal generation unit that generates an instruction signal used for the control of the state of a lighting device, and functions as an instruction signal generation means. The left lighting device ECU 5 and the right lighting device ECU 7 are examples of the control unit that controls the state of the lighting device according to instruction signals, and functions as a control means.

2. Process Performed by Left Lighting Device ECU 5 and Right Lighting Device ECU 7

Figure 2:
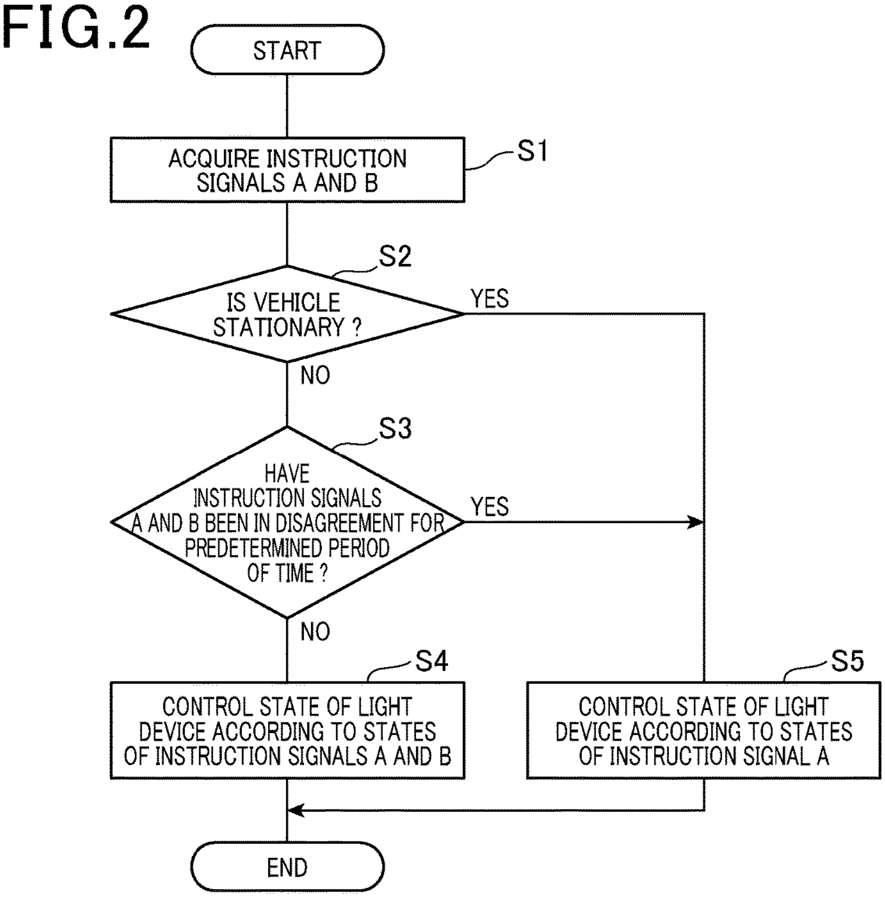
FIG. 2 is a flow diagram illustrating a process performed by a left lighting device ECU and a right lighting device ECU according to the first embodiment.
Figure 3:
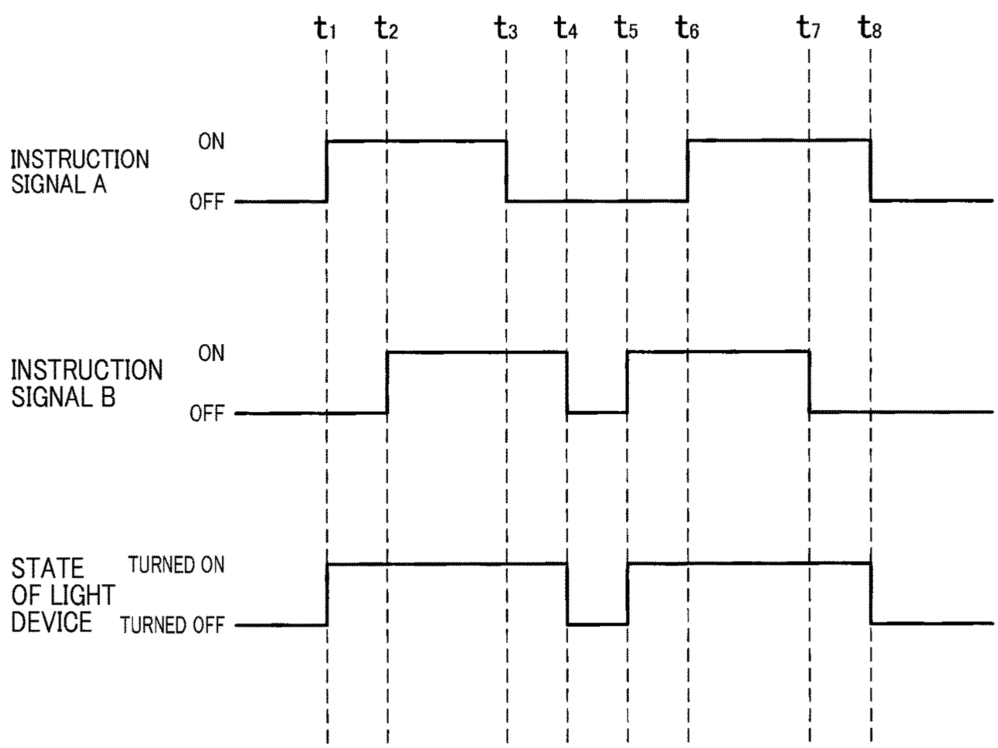
FIG. 3 is a diagram illustrating an example of a state transition of a lighting device designed based on the states of instruction signals according to the first embodiment.

With reference to FIGS. 2 and 3, the process cyclically performed by the left lighting device ECU 5 will now be described.

As illustrated in FIG. 2, the left lighting device ECU 5 of the present embodiment acquires instruction signals A and B from the standard ECU 3 (S1). Then the left lighting device ECU 5 determines whether the own vehicle is stationary, that is, whether the speed of the own vehicle is zero, based on speed information acquired from the vehicle speed sensor 21 (S2). If the left lighting device ECU 5 determines that the own vehicle is not stationary (NO at S2), the process proceeds to the determination processing at step S3. If the own vehicle is determined to be stationary (YES at S2), the left lighting device ECU 5 causes the process to proceed to step S5.

The left lighting device ECU 5 determines whether the instruction signals A and B acquired from the standard ECU 3 have been in disagreement with each other for at least a predetermined period of time (whether a predetermined period of time has elapsed from the occurrence of a disagreement state) (S3). The instruction signals A and B are in disagreement with each other when for example, the instruction signal A indicates on and the instruction signal B indicates off, or when the instruction signal A indicates off and the instruction signal B indicates on. If a predetermined period of time has not elapsed from the occurrence of a disagreement state of the instruction signals A and B (NO at S3), the left lighting device ECU 5 causes the process to proceed to step S4. If the instruction signals A and B have been in disagreement for at least the predetermined period of time (YES at S3), the left lighting device ECU 5 causes the process to proceed to step S5.

The left lighting device ECU 5 controls the state of the left lighting device 13 according to the states of the instruction signals A and B (S4). In this processing, the left lighting device ECU 5 controls the left lighting device 13 so as to be brought into a predetermined state, according to the states of the instruction signals A and B. Specifically, the left lighting device ECU 5 turns on the light source 17 of the lighting device 13 when at least one of the instruction signals A and B (the plurality of instruction signals) indicates on (i.e., the value instructing turn-on). The left lighting device ECU 5 turns off the light source 17 of the lighting device 13 when the instruction signals A and B (the plurality of instruction signals) both indicate off (i.e., the value instructing turn-off). In this way, the left lighting device ECU 5 brings the left lighting device 13 into a predetermined state according to the states of instructions signals A and B.

FIG. 3 is a diagram illustrating an example of a state transition of the left lighting device 13, designed based on the states of instruction signals A and B. From time $t_1$ to time $t_4$ and from time $t_5$ to time $t_8$, at least one of the instruction signals A and B indicates on, and thus the left lighting device 13 is on. At or before time $t_1$, from time $t_4$ to time $t_5$, and at or after time $t_8$, the instruction signals A and B both indicate off, and thus the left lighting device 13 is off.

If the outcome of the determination at step S2 or S3 is positive (YES at S2 or S3), the left lighting device ECU 5 controls the state of the left lighting device 13 according to the instruction signal A (S5). Specifically, if the instruction signal A indicates on, the left lighting device ECU 5 turns on the light source 17 of the left lighting device 13, and if the instruction signal A indicates off, the left lighting device ECU 5 turns off the light source 17 of the left lighting device 13. In this processing, the instruction signal B does not affect the state of the left lighting device 13. The instruction signal A is an example of the reference instruction signal for controlling the state of the left lighting device 13 and the right lighting device 15. The right lighting device ECU 7 performs a process similar to that performed by the left lighting device ECU 5, that is, the process illustrated in FIG. 2, to control the state of the right lighting device 15.

3. Advantageous Effects of Lighting Device Control System 1

(1A) The lighting device control system 1 of the present embodiment controls the states of the left and right lighting devices 13 and 15 according to the states of instruction signals A and B (the plurality of instruction signals). With this configuration, the lighting device control system 1 has a higher probability of appropriately maintaining the states of the left and right lighting devices 13 and 15 than in a control method in which only a single instruction signal is used.

With the control method in which only a single instruction signal is used, an erroneous instruction signal is outputted when for example, an ECU fails to operate or communicate normally. This causes the left and right lighting devices 13 and 15 to be brought into states different from those requested through the user's manipulation. Specifically, for example, the left and right lighting devices 13 and 15 are turned off while the switch 11 is on, and consequently, the driver has zero visibility, or the left and right lighting devices 13 and 15 are turned on while the switch 11 is off, leading to rapid exhaustion of the battery. The lighting device control system 1 of the present embodiment prevents such events from occurring.

(1B) The lighting device control system 1 of the present embodiment turns on the left and right lighting devices 13 and 15 when at least one of the instruction signals A and B (the plurality of instruction signals) indicates on. This configuration enables the lighting device control system 1 of the present embodiment to turn on the left and right lighting devices 13 and 15 even when one of the instruction signals A and B indicates an erroneous value in the situation where the left and right lighting devices 13 and 15 are both required to be turned on.

(1C) The lighting device control system 1 of the present embodiment controls the states of the left and right lighting devices 13 and 15 according to the instruction signal A when the own vehicle is stationary. This configuration allows the lighting device control system 1 of the present embodiment to reduce a processing burden on the left lighting device ECU 5 and the right lighting device ECU 7. The reason why this control processing is adopted for the lighting device control system 1 of the present embodiment is that when the own vehicle is stationary, a serious problem can be avoided if the states of the left and right lighting devices 13 and 15 do not conform to the state of the switch 11 (i.e., the state requested through the user's manipulation).

(1D) The lighting device control system 1 of the present embodiment controls the states of the left and right lighting devices 13 and 15 according to the instruction signal A if values of the instruction signals A and B have been in disagreement with each other for at least a predetermined period of time. This configuration allows the lighting device control system 1 of the present embodiment to prevent the left and right lighting devices 13 and 15 from being turned on for an excessive period of time.

Second Embodiment

1. Configuration of Lighting Device Control System 1

The configuration of a lighting device control system 1 of the present embodiment is similar to that of the first embodiment (the configuration illustrated in FIG. 1).

2. Process Performed by Left Lighting Device ECU 5 and Right Lighting Device ECU 7

A left lighting device ECU 5 of the present embodiment performs a process similar to that of the first embodiment (the process illustrated in FIG. 2). The following description, therefore, focuses on differences from the first embodiment, with description of processing common to the embodiments omitted.

In the processing at step S4 (processing for determining whether instruction signals A and B have been and are still in disagreement with each other), the left lighting device ECU 5 of the present embodiment controls the state of the left lighting device 13 in the following way. If the left lighting device 13 is off at the time when the processing at step S4 is supposed to be initiated, the left lighting device ECU 5 controls the state of the left lighting device 13 according to the instruction signal A. Specifically, for example, when the instruction signal A indicates on, the left lighting device ECU 5 turns on the left lighting device 13, and when the instruction signal A indicates off, keeps the left lighting device 13 turned off. At this time, the instruction B does not affect the state of the left lighting device 13.

When the left lighting device 13 is on at the time when the processing at step S4 is supposed to be initiated, the left lighting device ECU 5 keeps the left lighting device 13 turned on, on the condition that at least one of the instruction signals A and B (the plurality of instruction signals) indicates on. If both the instruction signals A and B indicate off, the left lighting device ECU 5 turns off the left lighting device 13.

Figure 4:
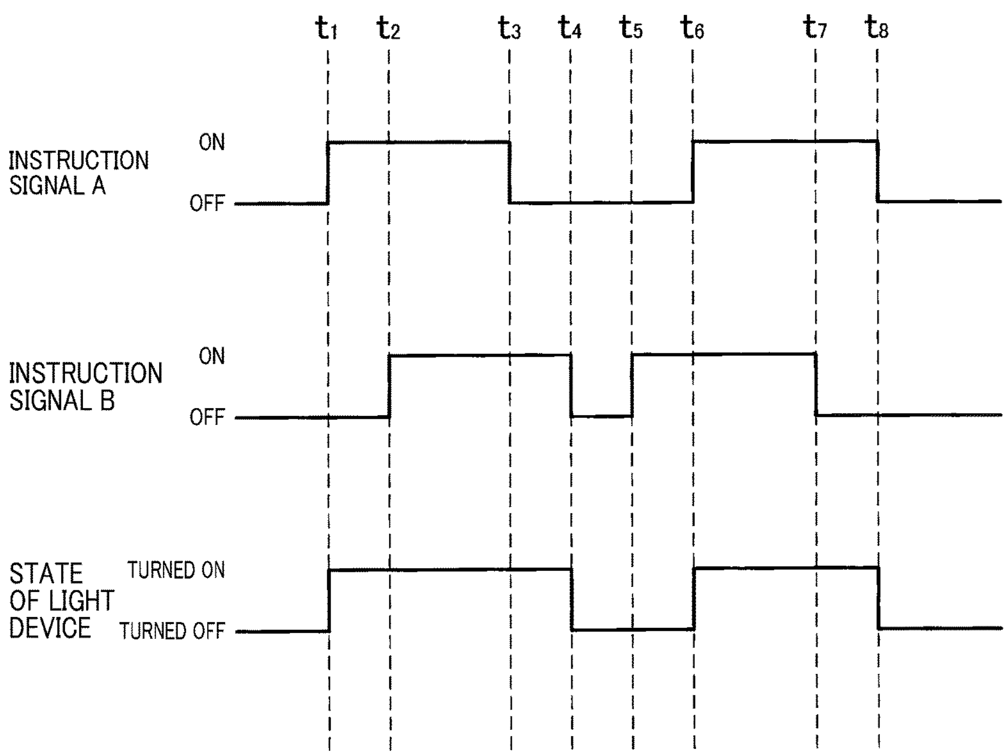
FIG. 4 is a diagram illustrating an example of a state transition of a lighting device designed based on the states of instruction signals according to a second embodiment.

FIG. 4 is a diagram illustrating an example of a state transition of the left lighting device 13, designed based on the states of instruction signals A and B. At the time point immediately before time $t_1$, the left lighting device 13 is off. At time $t_1$ when the instruction signal A indicates on, the left lighting device 13 is turned on in response to the instruction signal A. At this time, the instruction signal B does not affect the state of the left lighting device 13.

At the time point immediately before time $t_3$, the left lighting device 13 is on. At time $t_3$ when the instruction signal A indicates off, the left lighting device 13 is kept turned on because at least one (instruction signal B) of the instruction signals A and B indicates on.

At the time point immediately before time $t_4$, the left lighting device 13 is on. At time $t_4$ when both the instruction signals A and B indicate off, the left lighting device 13 is turned off. At the time point immediately before time $t_5$, the left lighting device 13 is off. At time $t_5$ when the instruction signal A indicates off, the left lighting device 13 is kept turned off. At this time, the instruction signal B does not affect the state of the left lighting device 13 even when the instruction signal B indicates on.

At the time point immediately before time $t_6$, the left lighting device 13 is off. At time $t_6$ when the instruction signal A indicates on, the left lighting device 13 is turned on in response to the instruction signal A. At this time, the instruction signal B does not affect the state of the left lighting device 13.

At the time point immediately before time $t_7$, the left lighting device 13 is on. At time $t_7$ when the instruction signal B indicates off, the left lighting device 13 is kept turned on because at least one (instruction signal A) of the instruction signals A and B indicates on.

At the time point immediately before time $t_8$, the left lighting device 13 is on. At time $t_8$ when the instruction signals A and B both indicate off, the left lighting device 13 is turned off. The right lighting device ECU 7 performs a process similar to that performed by the left lighting device ECU 5, to control the state of the right lighting device 15.

3. Advantageous Effects of Lighting Device Control System 1

According to the present embodiment, the lighting device control system 1 described in detail above achieves the following advantageous effects besides the effects (1A), (1C), and (1D) of the first embodiment.

(2A) When the left and right lighting devices 13 and 15 are on at the time when the processing for determining whether a plurality of instruction signals have been in disagreement with each other is supposed to be initiated, the lighting device control system 1 of the present embodiment keeps the left and right lighting devices 13 and 15 turned on if at least one of the instruction signals A and B indicates on. This configuration enables the lighting device control system 1 of the present embodiment to keep the turn-on state of the left and right lighting devices 13 and 15 even when one of the instruction signals A and B indicates an erroneous value in the situation where the left and right lighting devices 13 and 15 are both required to be turned on.

When the left and right lighting devices 13 and 15 are on at the time when the determination is supposed to be initiated, the lighting device control system 1 of the present embodiment controls the states of the left and right lighting devices 13 and 15 according to the instruction A. This configuration allows the lighting device control system 1 of the present embodiment to reduce a processing burden on the left lighting device ECU 5 and the right lighting device ECU 7.

Third Embodiment

1. Configuration of Lighting Device Control System 101

Figure 5:
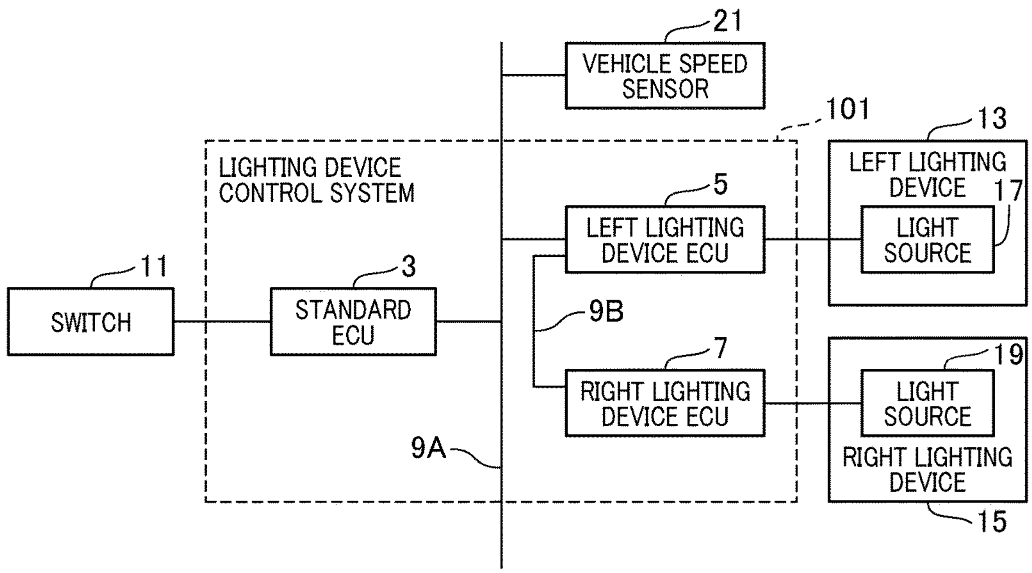
FIG. 5 is a block diagram illustrating a configuration of a lighting device control system according to a third embodiment.

As illustrated in FIG. 5, the configuration of a lighting device control system 101 of the present embodiment is basically similar to that of the first embodiment. The following description, therefore, focuses on differences from the first embodiment, with description of configurations common to the embodiments omitted. The lighting device control system 101 of the present embodiment includes a communication line 9A and a communication line 9B. The communication line 9A connects a standard ECU 3 to a left lighting device ECU 5. The communication line 9B connects the left lighting device ECU 5 to a right lighting device ECU 7. A communication line for directly connecting the standard ECU 3 to the right lighting device ECU 7 is not provided.

Instruction signals A and B outputted from the standard ECU 3 are transmitted to the left lighting device ECU 5 and then transmitted from the left lighting device ECU 5 to the right lighting device ECU 7.

2. Process Performed by Left Lighting Device ECU 5 and Right Lighting Device ECU 7

The left lighting device ECU 5 and the right lighting device ECU 7 each perform a process similar to that of the first embodiment (the process illustrated in FIG. 2).

3. Advantageous Effects of Lighting Device Control System 101

The lighting device control system 101 of the present embodiment achieves advantageous effects similar to those of the first embodiment, that is, the effects (1A) to (1D).

Fourth Embodiment

1. Configuration of Lighting Device Control System 201

Figure 6:
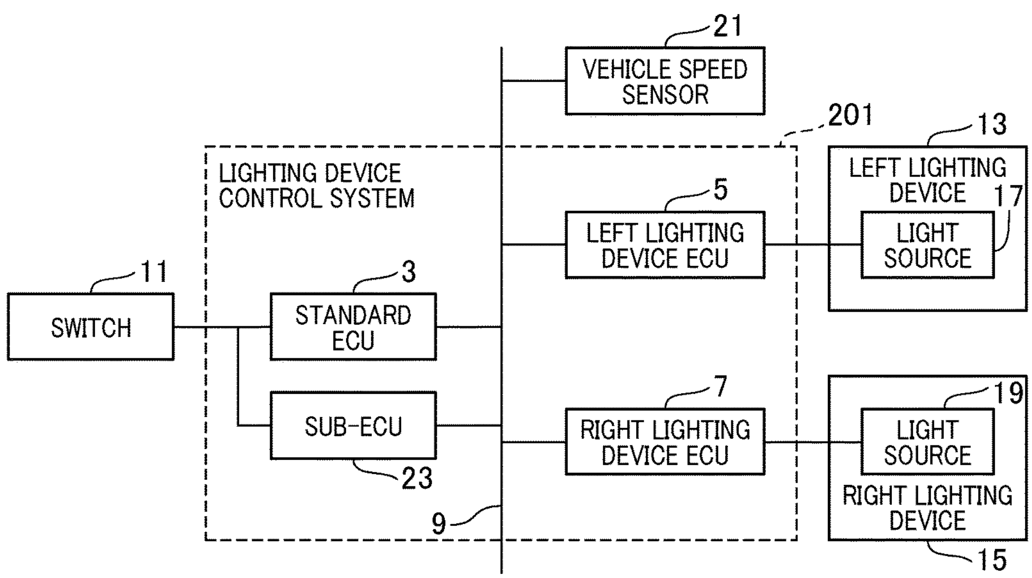
FIG. 6 is a block diagram illustrating a configuration of a lighting device control system according to a fourth embodiment.

As illustrated in FIG. 6, the configuration of a lighting device control system 201 of the present embodiment is basically similar to that of the first embodiment. The following description, therefore, focuses on differences from the first embodiment, with description of configurations common to the embodiments omitted. The lighting device control system 201 of the present embodiment includes a sub-ECU 23.

A signal from a switch 11 is inputted to both a standard ECU 3 and the sub-ECU 23. The input signal to the standard ECU 3 is equal in value to the input signal to the sub-ECU when the switch 11 operates normally.

The standard ECU 3 generates an instruction signal A used for the control (turn-on or turn-off) of the left and right lighting devices 13 and 15 according to the input signal from the switch 11, and outputs the instruction signal A. The sub-ECU 23 generates an instruction signal B used for the control of the left and right lighting devices 13 and 15 according to the input signal from the switch 11, and outputs the instruction signal B. The instruction signal A is equal in value to the instruction signal B when the switch 11, the standard ECU 3, and the sub-ECU 23 operate normally.

A communication line 9 connects the standard ECU 3 to a left lighting device ECU 5 and a right lighting device ECU 7, and connects the sub-ECU 23 to the left lighting device ECU 5 and the right lighting device ECU 7. The left lighting device ECU 5 acquires an instruction signal A from the standard ECU 3 and an instruction signal B from the sub-ECU 23 via the communication line 9. The right lighting device ECU 7 acquires an instruction signal A from the standard ECU 3 and an instruction signal B from the sub-ECU 23 via the communication line 9.

The transmission channel of the instruction signal A extends, via the communication line 9, from the standard ECU 3 to the left lighting device ECU 5 and the right lighting device ECU 7. The transmission channel of the instruction signal B extends, via the communication line 9, from the sub-ECU 23 to the left lighting device ECU 5 and the right lighting device ECU 7. Therefore, in the instruction signal transmission channel extending from the standard ECU 3 to the left lighting device ECU 5 and the right lighting device ECU 7, the instruction signal A and the instruction signal B are transmitted through different channels.

2. Process Performed by Left Lighting Device ECU 5 and Right Lighting Device ECU 7

The left lighting device ECU 5 and the right lighting device ECU 7 of the present embodiment each perform a process similar to that of the first embodiment (the process illustrated in FIG. 2).

3. Advantageous Effects of Lighting Device Control System 201

According to the present embodiment, the lighting device control system 1 described in detail above achieves the following advantageous effects besides the effects of the first embodiment, that is, (1A) to (1D).

(4A) In the lighting device control system 201 of the present embodiment, the instruction signal A and the instruction signal B are transmitted through different channels. With this configuration, if one of the channels has a failure and the failure causes an instruction signal passing through the channel to indicate an erroneous value, the lighting device control system 201 of the present embodiment transmits an instruction signal indicating a normal value to the left lighting device ECU 5 and the right lighting device ECU 7 via the other channel.

Possible Embodiments

The embodiments of the present disclosure have been described, but the present disclosure is not limited to these embodiments and can be implemented in various forms.

(1) The number of instruction signals is not limited to two.

(2) In the first to fourth embodiments, the speed of the own vehicle is used to determine whether the own vehicle is stationary in the determination at step S2. However, this configuration should not be construed in a limiting sense. For example, whether the own vehicle is stationary may be determined based on the state (on or off) of the ignition switch of the own vehicle. Specifically, the left lighting device ECU 5 may determine whether the ignition switch of the own vehicle is on, and if on, may cause the process to proceed to the determination at step S3. If the ignition switch of the own vehicle is off, the left lighting device 5 may cause the process to proceed to step S5. This processing performed by the left lighting device ECU 5 can be similarly performed by the right lighting device ECU 7. With the configuration of determining whether the own vehicle is stationary based on the state of the ignition switch, the lighting device control system 1 achieves the advantageous effect (1C) of the first embodiment.

(3) In the above-described processes performed by the left lighting device 5 and the right lighting device 7 according to the first to fourth embodiments, the determination at step S2 may be omitted, and the process may always proceed to the determination at step S3 upon completion of the processing at step S1. In the processes performed by the left lighting device 5 and the right lighting device 7, the determination at step S3 may be omitted. In this case, if the outcome of the determination at step S2 is negative, the process may always proceed to the processing at step S4. In the processes performed by the left lighting device 5 and the right lighting device 7, the determinations at steps S2 and S3 may be omitted, and the process may always proceed to the processing at step S4 upon completion of the processing at step S1.

(4) In the first to fourth embodiments, relationships of the states of the instruction signals A and B to the states of the left and right lighting devices 13 and 15 are described. However, these relationships should not be construed in a limiting sense, but may be designed as appropriate. The states of the left and right lighting devices 13 and 15 may be controlled according to the combination of the states of instruction signals A and B with the states of the left and right lighting devices 13 and 15.

(5) Besides the on or off states, the states instructed with the instruction signals A and B for use in the control of the left and right lighting devices 13 and 15 may be indicated in different ways. For example, the instruction signals A and B may instruct, for example, high beam/low beam, illuminance of the light sources 17 and 19, color of light, and range in which light is irradiated.

(6) In the first to fourth embodiments, functions of a single component may be distributed between a plurality of components, or functions of a plurality of components may be implemented by a single component. In the embodiments, at least part of the configurations may be replaced by a known configuration having a similar function. In the embodiments, part of the configurations may be eliminated. In any of the embodiments, at least part of the configurations may be added to or replaced by a configuration of another one of the embodiments. Any modes based on the technical idea defined by the wording of the claims are embodiments of the present disclosure.

(7) Besides the lighting device control system, the lighting device control technique of the present disclosure may be implemented in various forms, including a program to cause a computer to function as the lighting device control system, a medium storing the program, and a lighting device control method.

REFERENCE SIGNS LIST

1, 101, 201: Lighting device control system
3: Standard ECU
5: Left lighting device ECU
7: Right lighting device ECU
9, 9A, 9B: Communication line
11: Switch
13: Left lighting device
15: Right lighting device

17, 19: Light source
21: Vehicle speed sensor
23: Sub-ECU

The invention claimed is:

1. A lighting device control system comprising:

an instruction signal generation unit that generates an instruction signal used for controlling a state of a lighting device mounted to a vehicle; and a control unit that controls the state of the lighting device according to the instruction signal, wherein the instruction signal generation unit generates a plurality of instruction signals, and the control unit controls the state of the lighting device so as to be brought into a predetermined turn-on or turn-off state according to an on or off state of the plurality of the instruction signals, wherein when the lighting device is off, the control unit controls the state of the lighting device according to a reference instruction signal included in the plurality of instruction signals, and when the lighting device is on, the control unit keeps the lighting device turned on, on the condition that at least one of the plurality of instruction signals provides a turn-on instruction.

2. The lighting device control system according to claim 1, wherein the control unit turns on the lighting device when at least one of the plurality of instruction signals provides the turn-on instruction.

3. The lighting device control system according to claim 1, wherein when the vehicle is stationary, or when an ignition switch is off, the control unit controls the state of the lighting device according to the reference instruction signal included in the plurality of instruction signals.

4. The lighting device control system according to claim 1, wherein when values of the plurality of instruction signals have been in disagreement with each other for a predetermined period of time or more, the control unit controls the state of the lighting device according to the reference instruction signal included in the plurality of instruction signals.

5. The lighting device control system according to claim 1, wherein in a channel for transmitting an instruction signal from the instruction signal generation unit to the control unit, at least one of the plurality of instruction signals is transmitted through a channel different from the channel of another instruction signal.

* * * * *